(12) United States Patent
Chen et al.

(10) Patent No.: US 11,169,019 B2
(45) Date of Patent: Nov. 9, 2021

(54) DISTRIBUTED FIBER OPTIC ACOUSTIC SENSOR

(71) Applicant: Luna Innovations Incorporated, Roanoke, VA (US)

(72) Inventors: Hongxin Chen, Chino, CA (US); Xiaotian Steve Yao, Diamond Bar, CA (US)

(73) Assignee: Luna Innovations Incorporated, Roanoke, VA (US)

( * ) Notice: Subject to any disclaimer, the term of this patent is extended or adjusted under 35 U.S.C. 154(b) by 387 days.

(21) Appl. No.: 16/076,295

(22) PCT Filed: Feb. 10, 2017

(86) PCT No.: PCT/US2017/017375
§ 371 (c)(1),
(2) Date: Aug. 7, 2018

(87) PCT Pub. No.: WO2017/139579
PCT Pub. Date: Aug. 17, 2017

(65) Prior Publication Data
US 2020/0393290 A1    Dec. 17, 2020

Related U.S. Application Data

(60) Provisional application No. 62/293,685, filed on Feb. 10, 2016.

(51) Int. Cl.
*G01H 9/00* (2006.01)
*G01L 1/24* (2006.01)

(52) U.S. Cl.
CPC ............. *G01H 9/004* (2013.01); *G01L 1/246* (2013.01)

(58) Field of Classification Search
CPC ............................... G01H 9/004; G01L 1/246
(Continued)

(56) References Cited

U.S. PATENT DOCUMENTS 6,466,706 B1 * 10/2002 Go ..................... G01D 5/35303
                                                           385/12
6,785,004 B2 *  8/2004 Kersey ............... G01D 5/35383
                                                           356/478

(Continued)

OTHER PUBLICATIONS

International Search Report and Written Opinion dated Jun. 27, 2017 of PCT/US2017/017375 (19 pages).

*Primary Examiner* — Octavia Hollington
(74) *Attorney, Agent, or Firm* — Nixon & Vanderhye P.C.

(57) ABSTRACT

One example coherent optical time domain reflectometer device includes a coherent light source that produces coherent probe light pulses at an optical wavelength; an optical coupling unit coupled to f a fiber link under test to direct the coherent probe light pulses into the fiber link and to receive reflected probe light pulses from the fiber link; an optical detection unit to receive the reflected probe light pulses and structured to include an optical interferometer to process the reflected probe light pulses along two different optical paths to generate different optical output signals from the reflected probe light pulses along different optical paths, and optical detectors to receive the optical output signals from the optical interferometer; and a device controller coupled to the optical detection unit to extract information on spatial distribution of acoustic—or vibration—or strain-dependent characteristics as a function of distance along the fiber link under test.

18 Claims, 18 Drawing Sheets

Monitor DAS (*Aspect 1*)

Method and System of Distributed Fiber Optical Acoustic Sensing
• PDD removes polarization fading
• Compensation method removes (laser) phase fading
• Squared deviation of two detected powers to extract acoustic amplitude
• Group of four RAW data signal processing for up to one (1) second to enhance dynamics
• Phase normalization w/o effected by any DC, such as ASE, by low frequency phase mod.
• DSP enhances data processing

(58) Field of Classification Search
USPC .......................................................... 73/657
See application file for complete search history.

(56) References Cited

U.S. PATENT DOCUMENTS

| | | | | |
|---|---|---|---|---|
| 7,433,045 | B2 * | 10/2008 | Ronnekleiv | ........ G01D 5/35312 |
| | | | | 356/478 |
| 9,154,223 | B2 * | 10/2015 | Lewis | ................ G01M 11/3127 |
| 2011/0228255 | A1 | 9/2011 | Li et al. | |
| 2013/0113629 | A1 | 5/2013 | Hartog et al. | |
| 2013/0188177 | A1 | 7/2013 | Lovely et al. | |
| 2014/0139226 | A1 | 5/2014 | Jaaskelainen et al. | |

\* cited by examiner

FIG. 1 – Monitor DAS (Aspect 1)

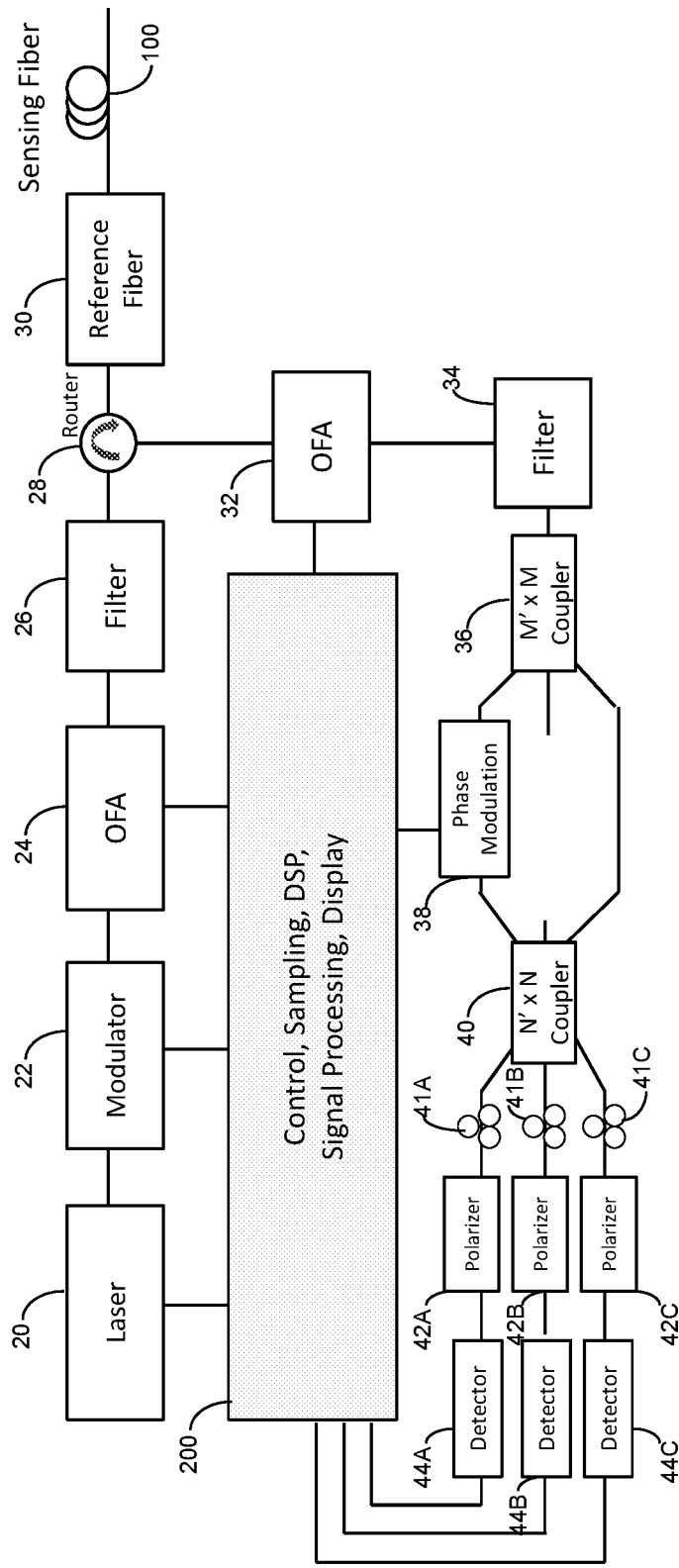

Method and System of Distributed Fiber Optical Acoustic Sensing

- PDD removes polarization fading
- Compensation method removes (laser) phase fading
- Squared deviation of two detected powers to extract acoustic amplitude
- Group of four RAW data signal processing for up to one (1) second to enhance dynamics
- Phase normalization w/o effected by any DC, such as ASE, by low frequency phase mod.
- DSP enhances data processing

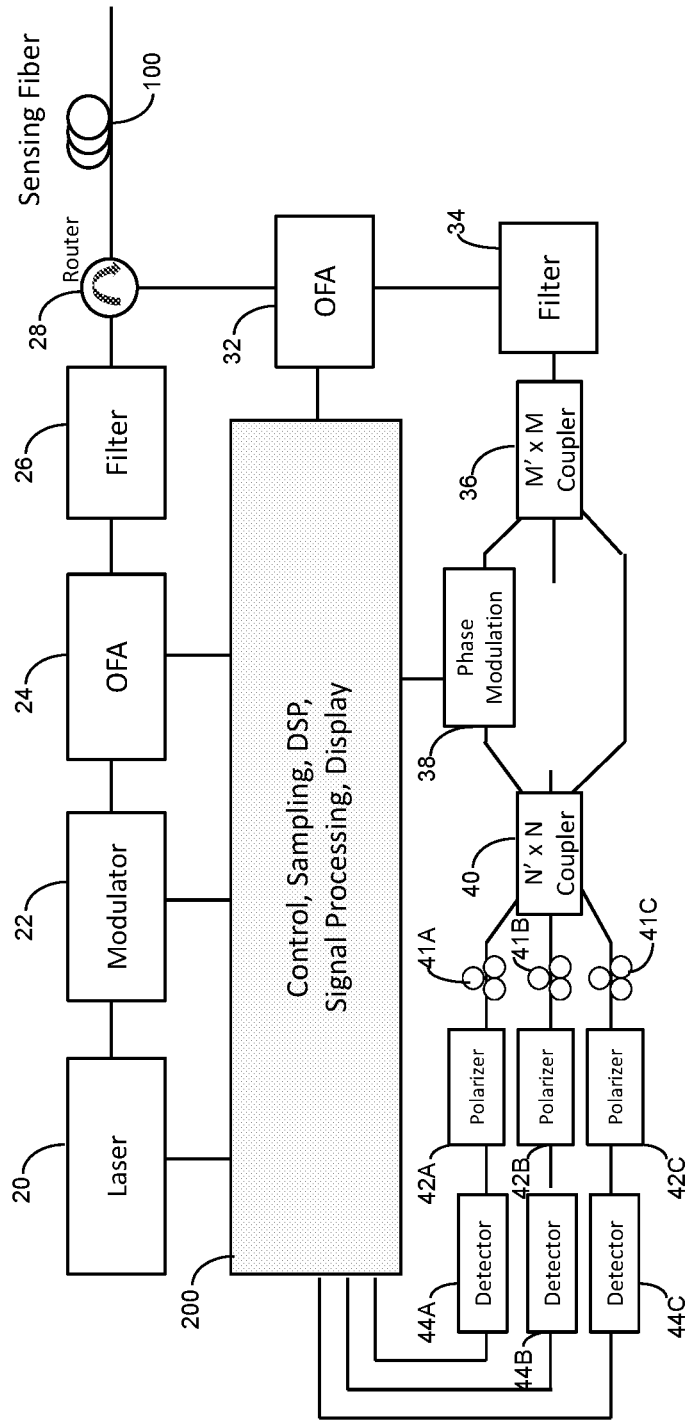

**FIG. 1A – Monitor DAS (*Aspect 1*)**

Method and System of Distributed Fiber Optical Acoustic Sensing
• PDD removes polarization fading
• Compensation method removes (laser) phase fading
• Squared deviation of two detected powers to extract acoustic amplitude
• Group of four RAW data signal processing for up to one (1) second to enhance dynamics
• Phase normalization w/o effected by any DC, such as ASE, by low frequency phase mod.
• DSP enhances data processing

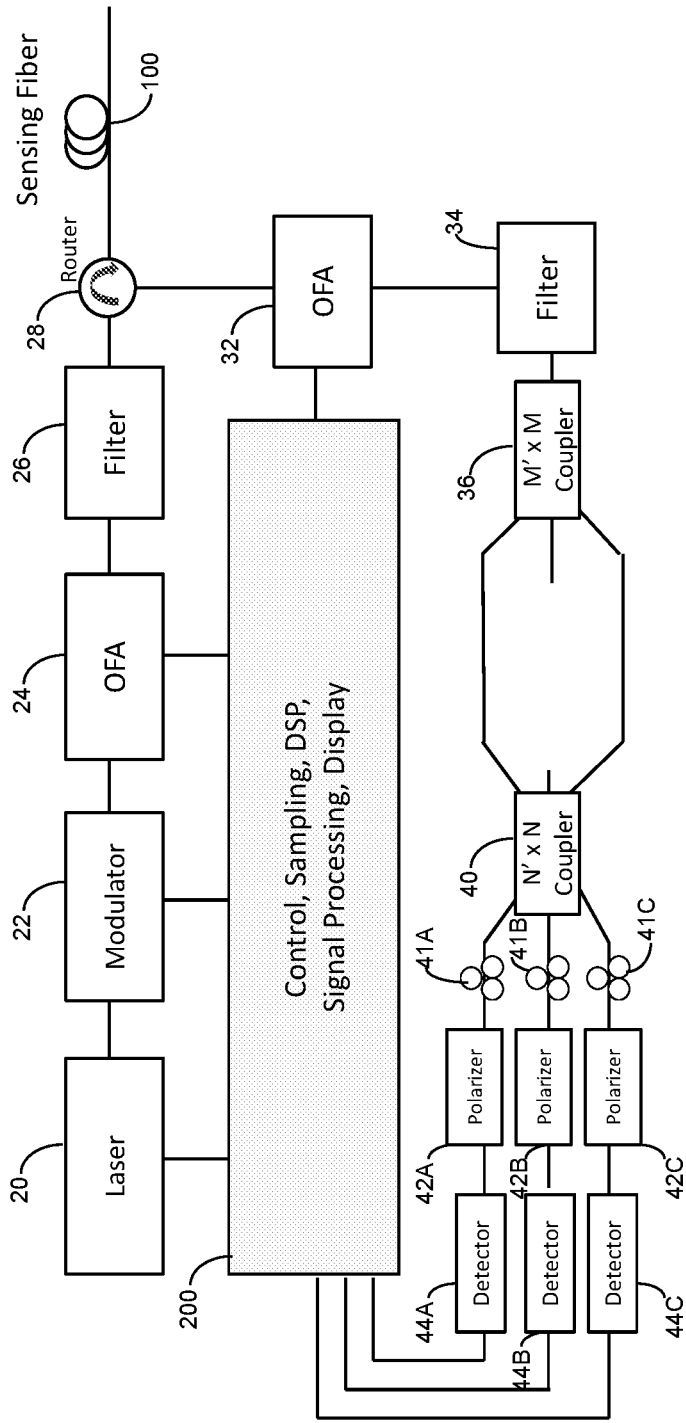

FIG. 1B – Monitor DAS (*Aspect 1*)

Method and System of Distributed Fiber Optical Acoustic Sensing
• PDD removes polarization fading
• Compensation method removes (laser) phase fading
• Squared deviation of two detected powers to extract acoustic amplitude
• Group of four RAW data signal processing for up to one (1) second to enhance dynamics
• Phase normalization w/o effected by any DC, such as ASE, by low frequency phase mod.
• DSP enhances data processing

FIG. 1C – Monitor DAS (*Aspect 1*)

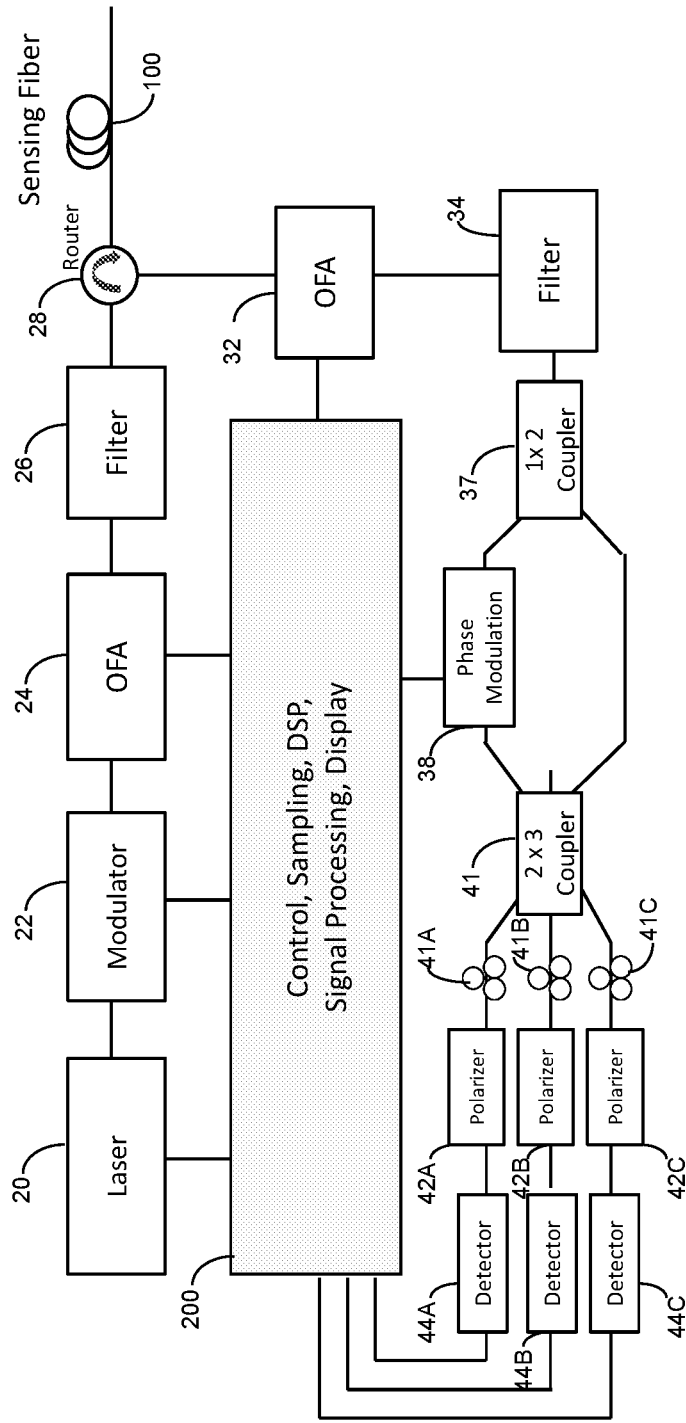

Method and System of Distributed Fiber Optical Acoustic Sensing
• PDD removes polarization fading
• Compensation method removes (laser) phase fading
• Squared deviation of two detected powers to extract acoustic amplitude
• Group of four RAW data signal processing for up to one (1) second to enhance dynamics
• Phase normalization w/o effected by any DC, such as ASE, by low frequency phase mod.
• DSP enhances data processing

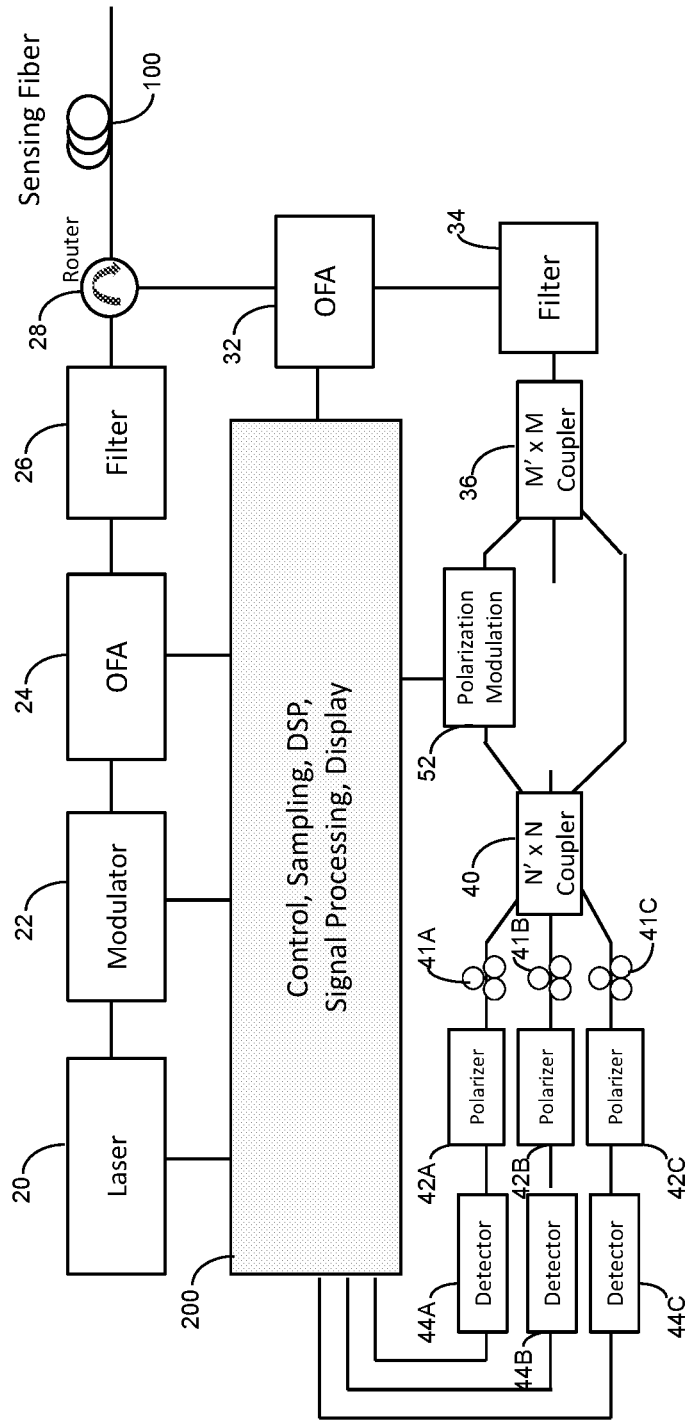

FIG. 1D – Monitor DAS (*Aspect 1*)

Method and System of Distributed Fiber Optical Acoustic Sensing
• PDD removes polarization fading
• Compensation method removes (laser) phase fading
• Squared deviation of two detected powers to extract acoustic amplitude
• Group of four RAW data signal processing for up to one (1) second to enhance dynamics
• Phase normalization w/o effected by any DC, such as ASE, by low frequency phase mod.
• DSP enhances data processing

FIG. 1E – Monitor DAS (*Aspect 1*)

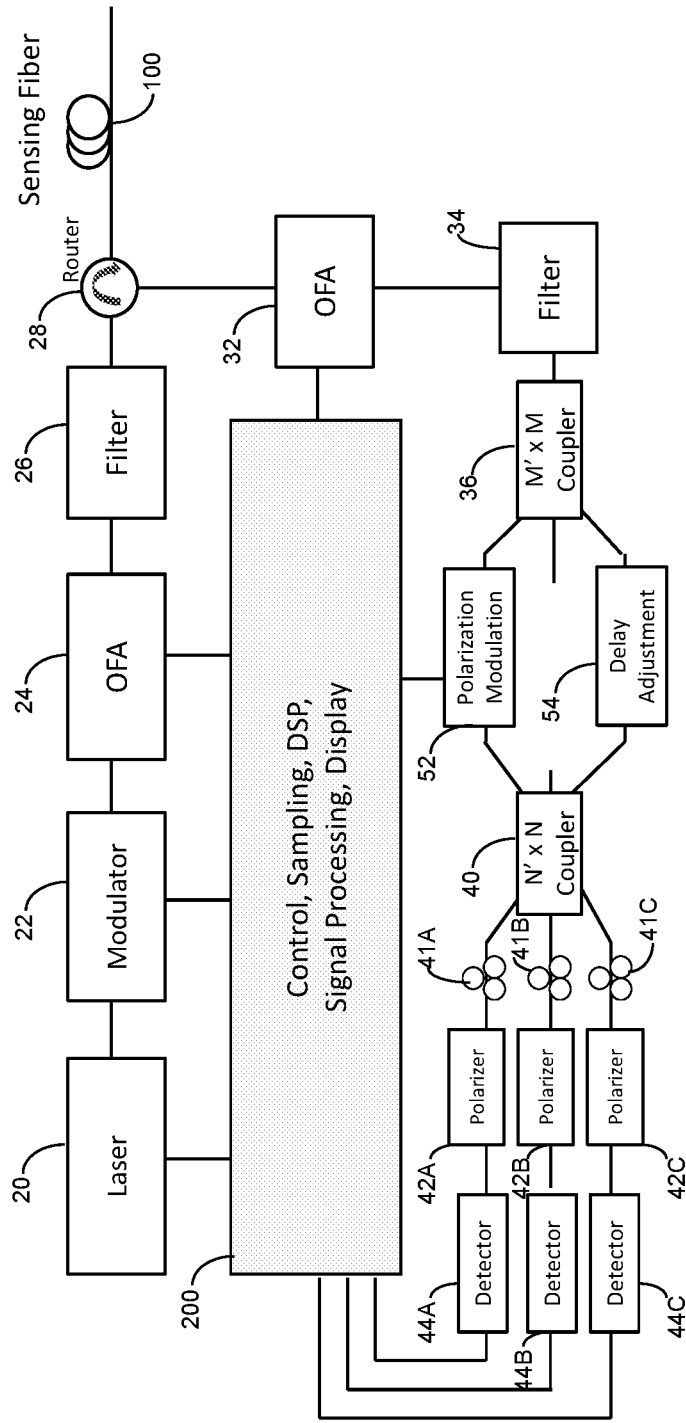

Method and System of Distributed Fiber Optical Acoustic Sensing
• PDD removes polarization fading
• Compensation method removes (laser) phase fading
• Squared deviation of two detected powers to extract acoustic amplitude
• Group of four RAW data signal processing for up to one (1) second to enhance dynamics
• Phase normalization w/o effected by any DC, such as ASE, by low frequency phase mod.
• DSP enhances data processing

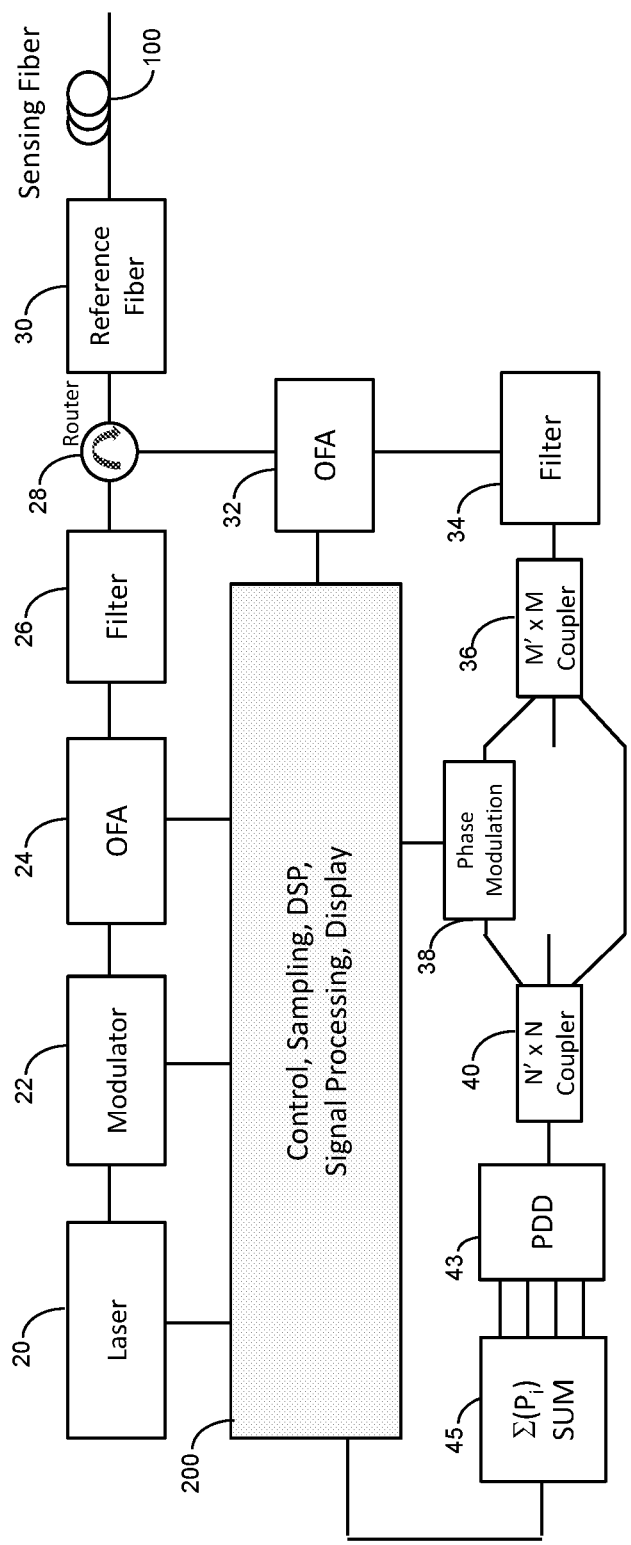

FIG. 1F – Monitor DAS (*Aspect 1*)

Method and System of Distributed Fiber Optical Acoustic Sensing
• PDD removes polarization fading
• Compensation method removes (laser) phase fading
• Squared deviation of two detected powers to extract acoustic amplitude
• Group of four RAW data signal processing for up to one (1) second to enhance dynamics
• Phase normalization w/o effected by any DC, such as ASE, by low frequency phase mod.
• DSP enhances data processing

FIG. 1G – Monitor DAS (*Aspect 1*)
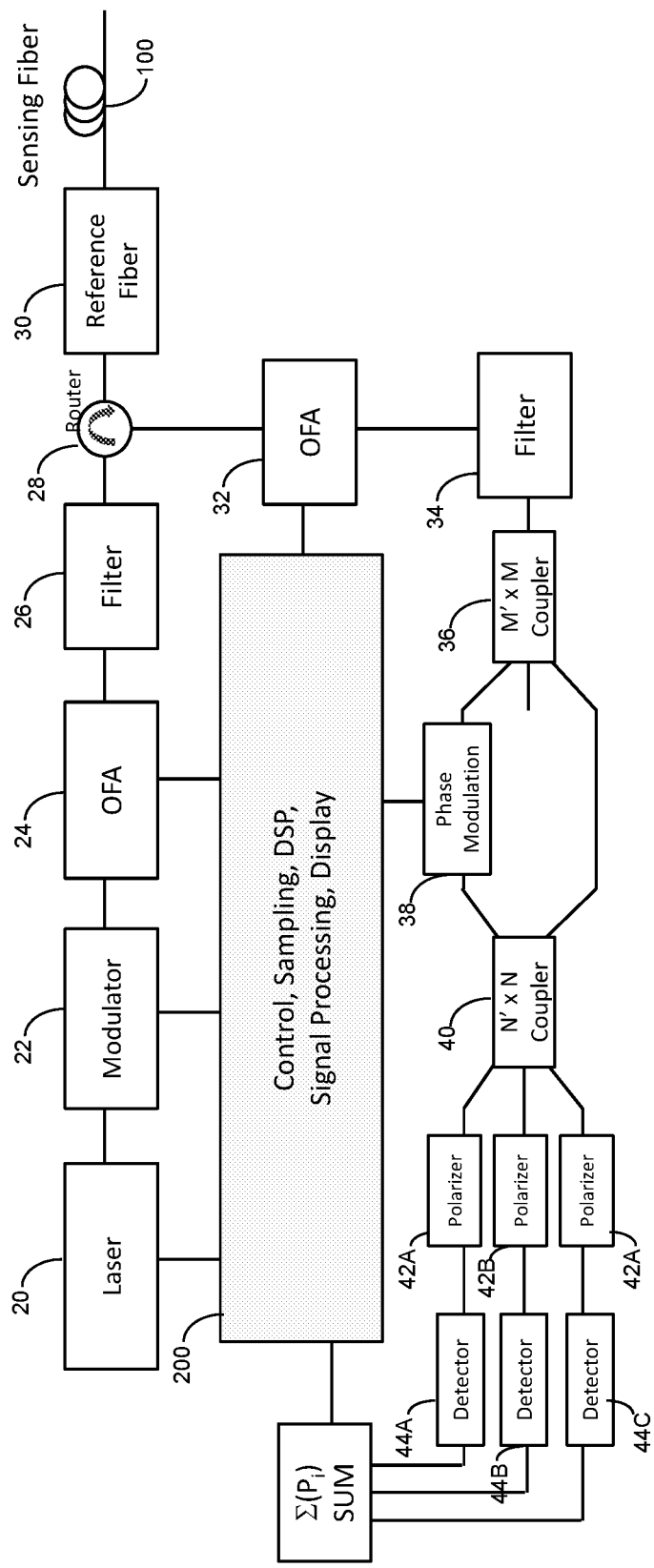
Method and System of Distributed Fiber Optical Acoustic Sensing
- PDD removes polarization fading
- SUM of three or more detected signals
- Fast DSP, data transferring, signal processing
- Low-cost

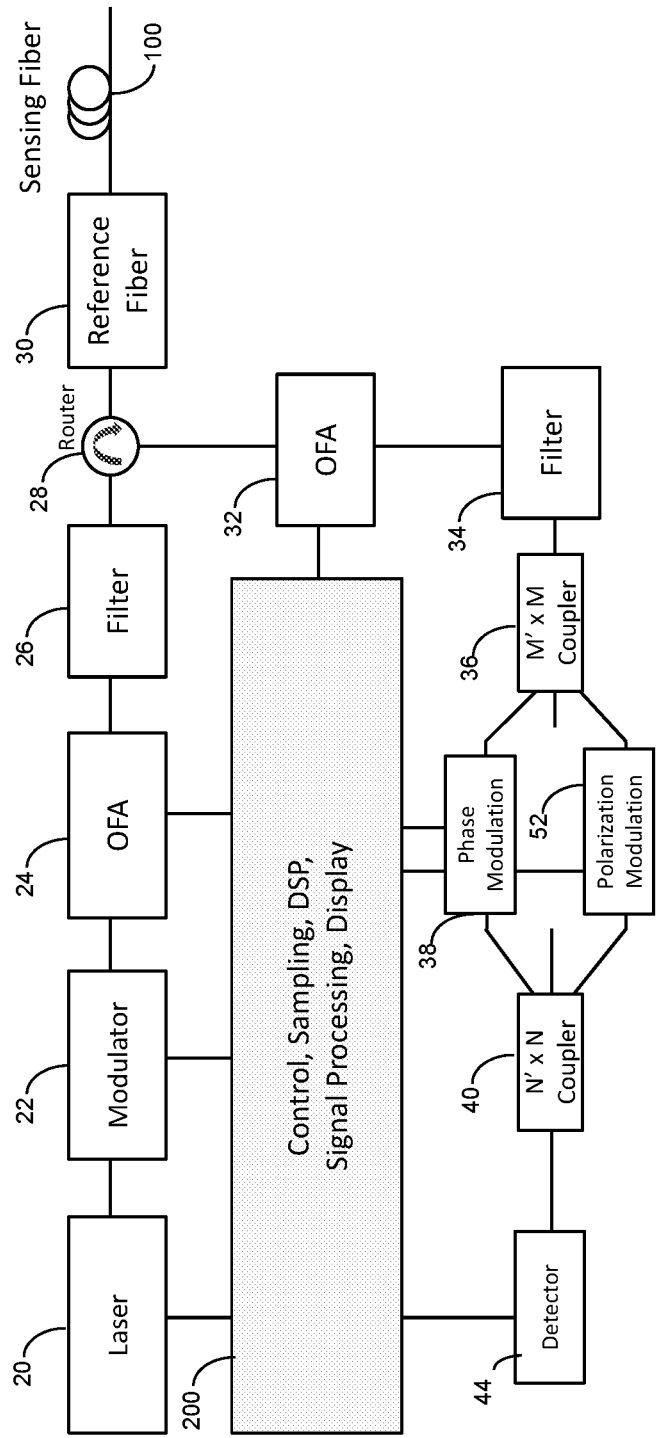
FIG. 1H – Monitor DAS (*Aspect 1*)
Method and System of Distributed Fiber Optical Acoustic Sensing
• Low-cost and simple design w/o PDD
• Polarization modulation reduces polarization fading degree
• Algorithm correction can remove polarization fading but reduce frequency response bandwidth

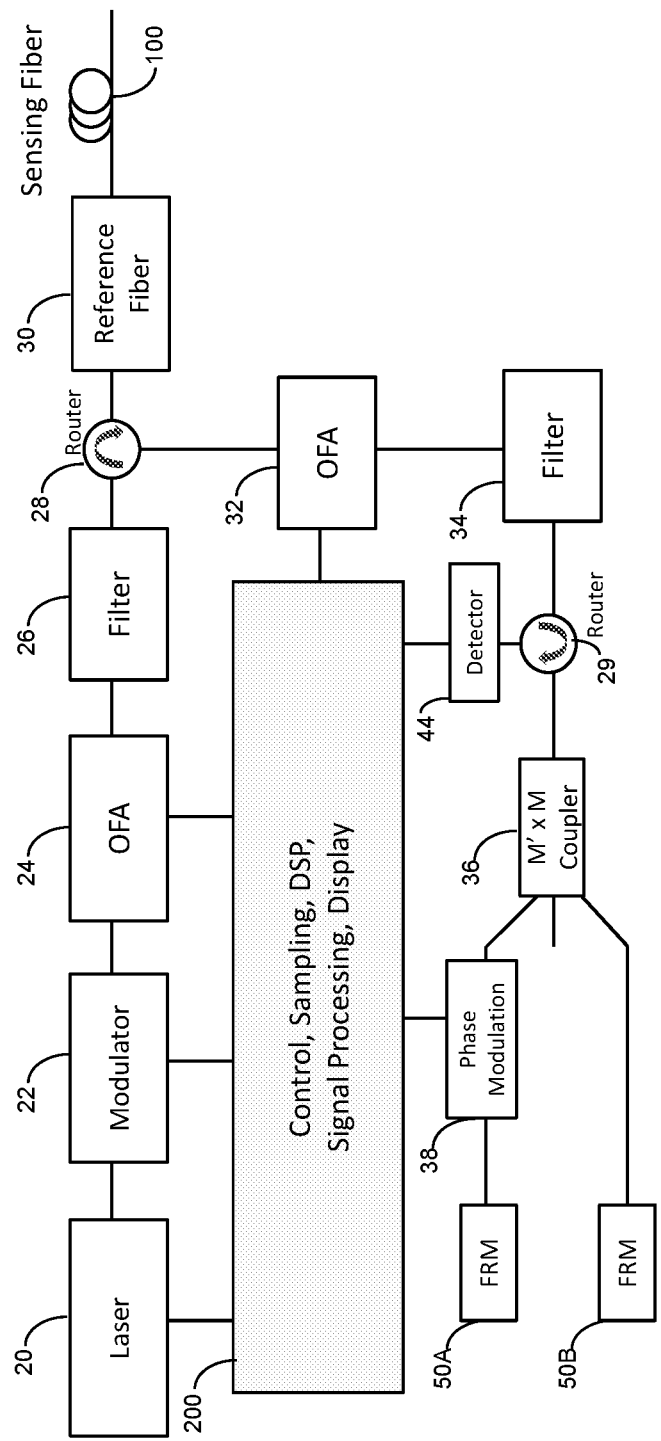
FIG. 1I – Monitor DAS (*Aspect 1*)
Method and System of Distributed Fiber Optic Acoustic Sensing
• FRM to reduce polarization effect from compensator

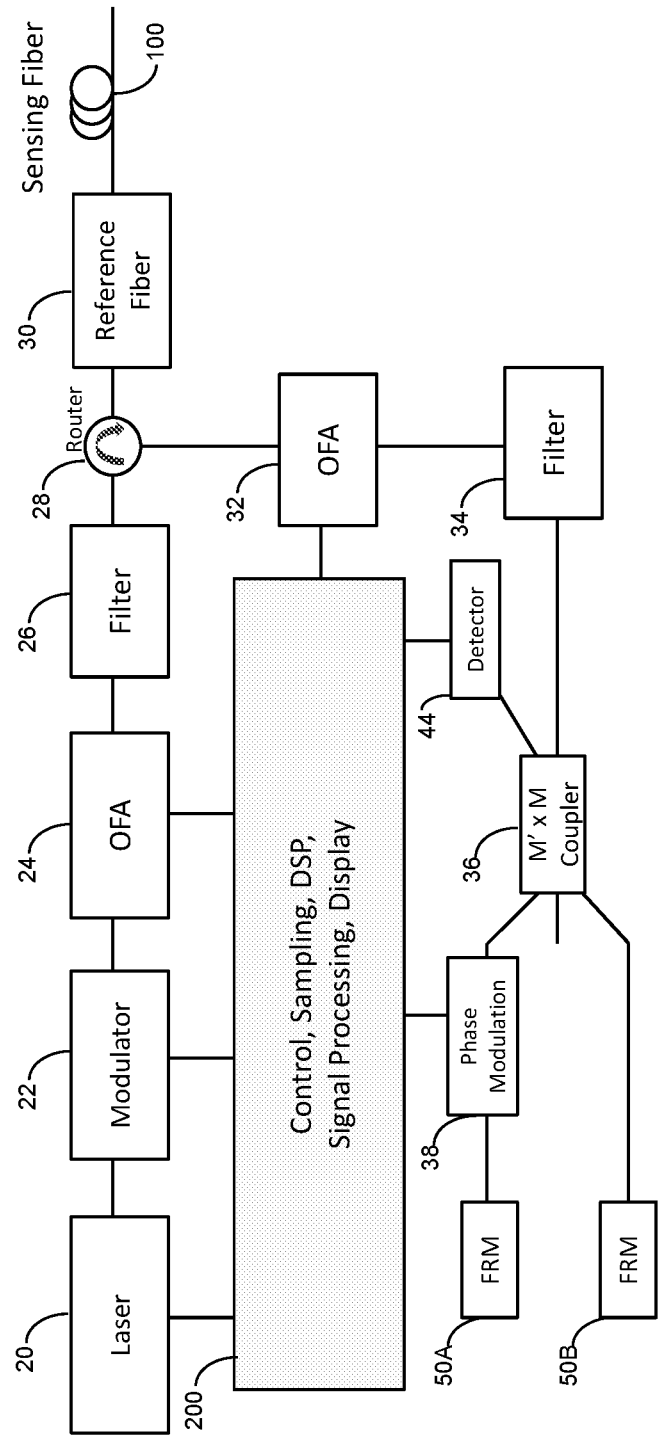
FIG. 1J – Monitor DAS (*Aspect 1*)
Method and System of Distributed Fiber Optic Acoustic Sensing
• FRM to reduce polarization effect from compensator

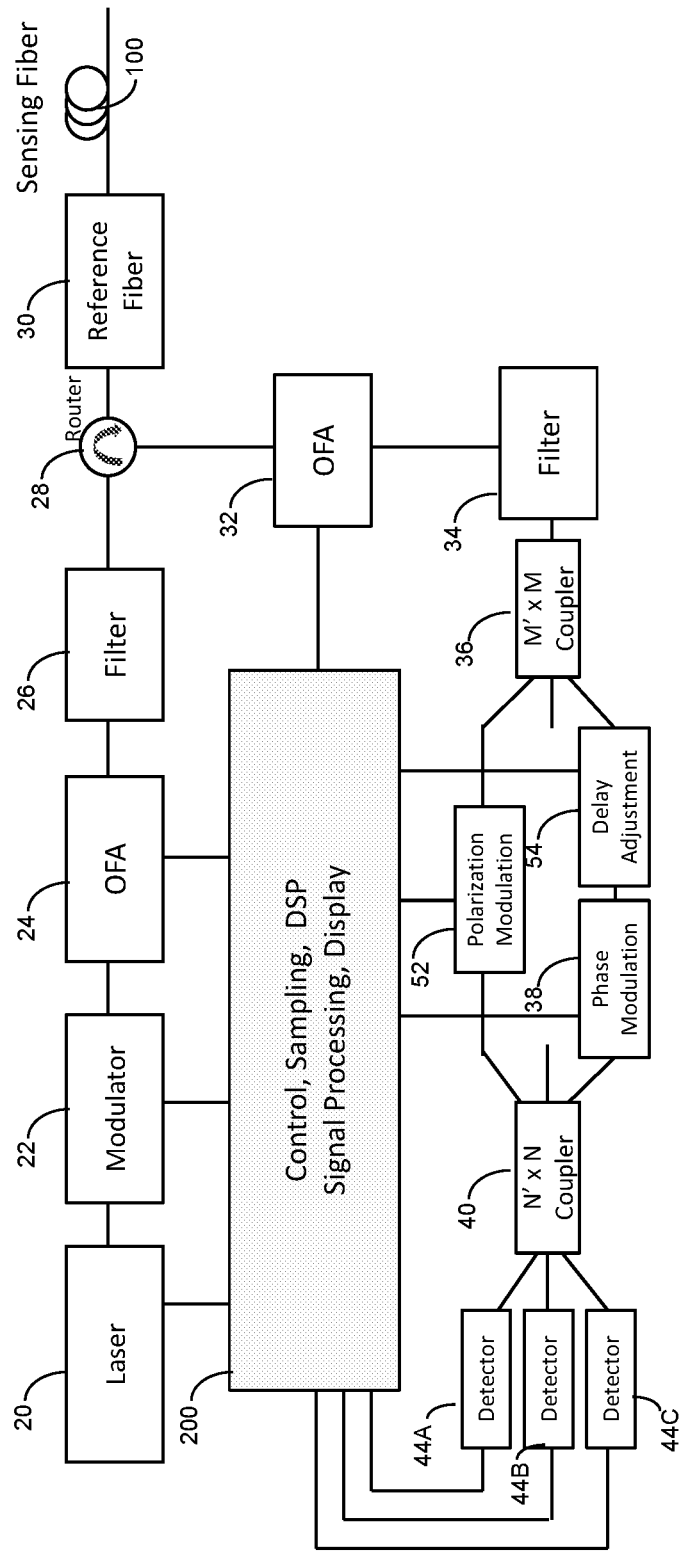

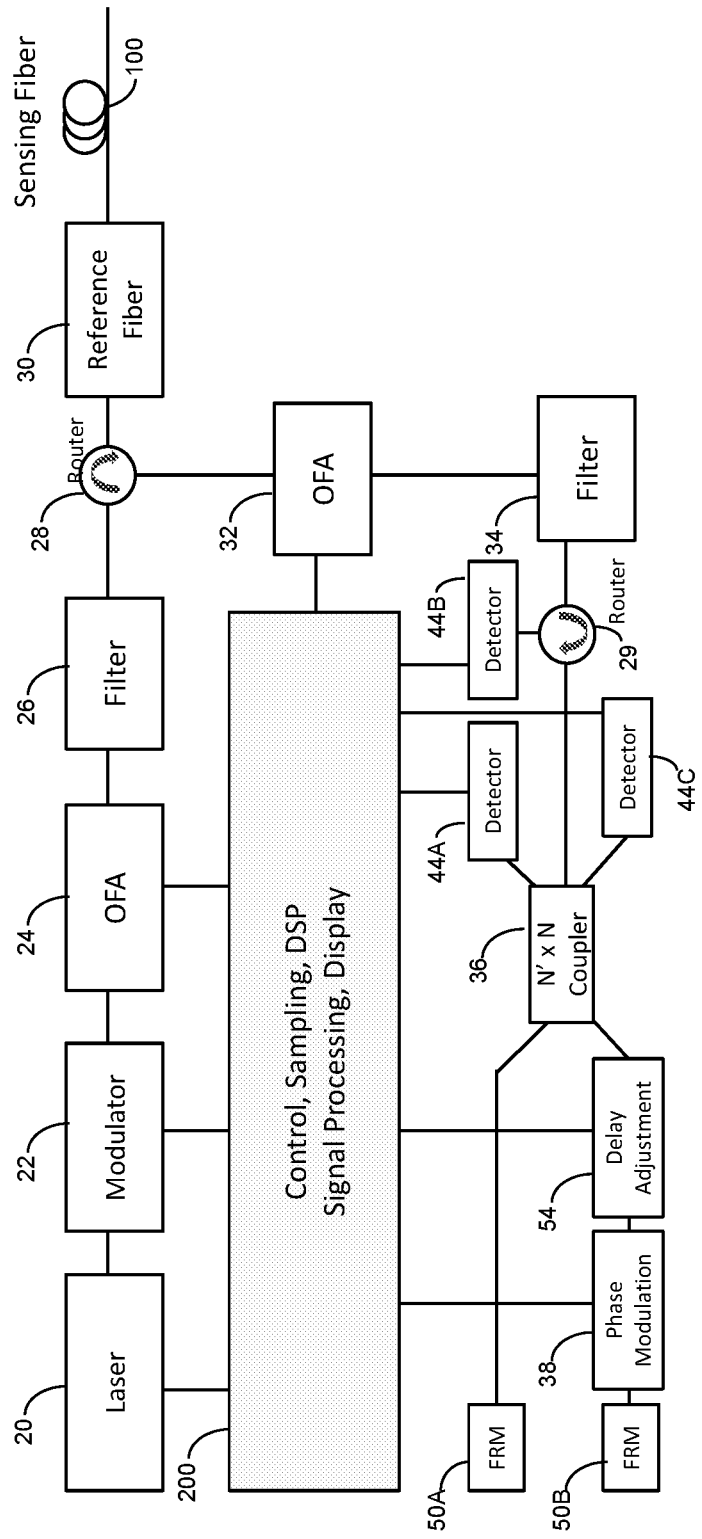
FIG. 2A – Phase DAS (Aspect 2)
Method and System of Distributed Fiber Optic Acoustic Sensing
• FRM to reduce polarization effect from compensator

FIG. 3 – Fiber Sensor (*Aspect 3*)
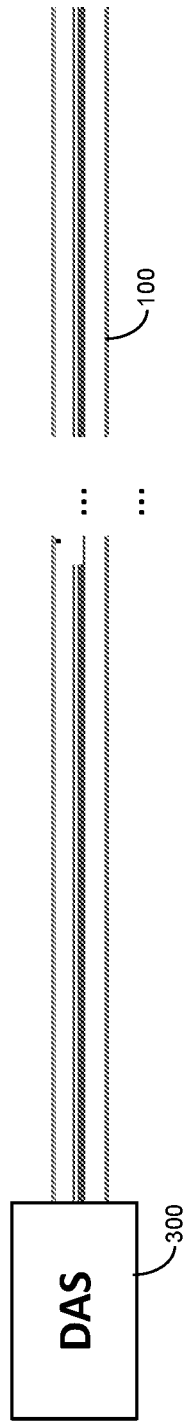
Method and System of Distributed Fiber Optical Acoustic Sensing
- Conventional DAS Fiber In Metal Tube (FIMT)
- "Soft material" along fiber cable to enhance sensitivity

FIG. 3A – Fiber Sensor (*Aspect 3*)
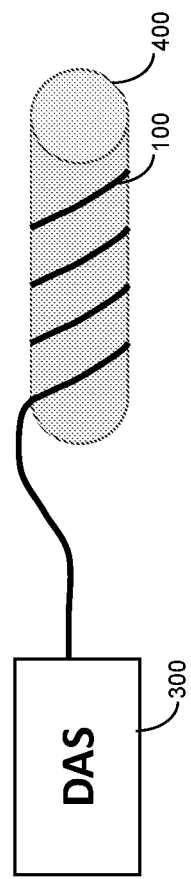
Method and System of Distributed Fiber Optical Acoustic Sensing
- Conventional DAS Fiber Mandela on the Pipeline
- "Soft material" along fiber cable to enhance sensitivity

FIG. 3B – Fiber Sensor (*Aspect 3*)
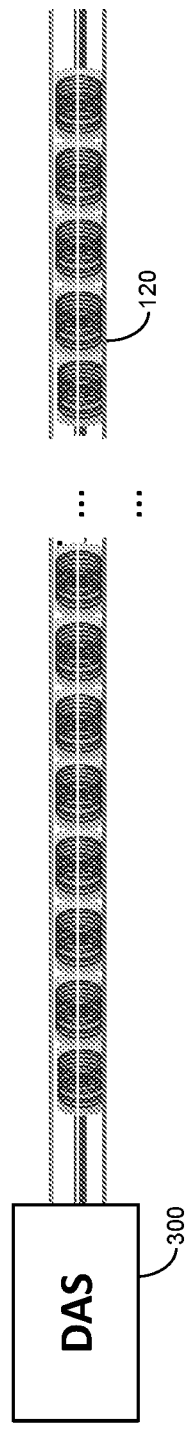

**FIG. 4 – Fiber Sensor (*Aspect 3*)**
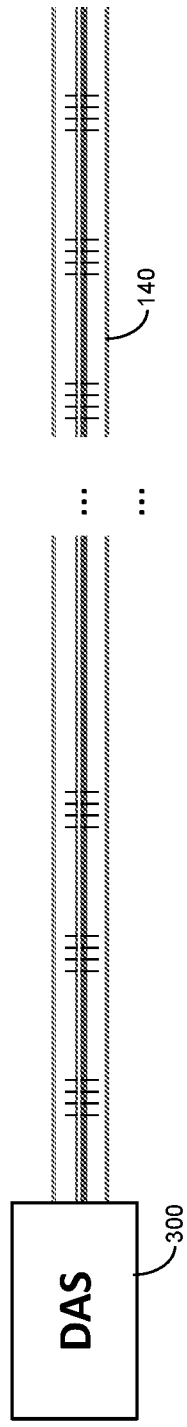
Method and System of Distributed Fiber Optical Acoustic Sensing
- Enhanced reflectivity of DAS cable, e.g. FBG reflectivity of -40 to -50 dB
- Achieve 100s to 1000s levels

FIG. 4A – Fiber Sensor (*Aspect 3*)
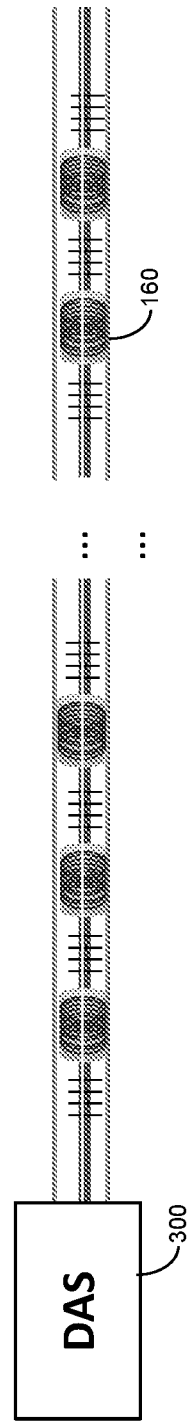
Method and System of Distributed Fiber Optical Acoustic Sensing
- Enhanced FOS cable for Time-Domain Integration (TDI), e.g. FBG reflectivity -40 to -50dB
- Achieve 100s to 1000s levels
- 1-D or 3-D cylinder tube fiber sensors

DISTRIBUTED FIBER OPTIC ACOUSTIC SENSOR

CROSS-REFERENCE TO RELATED APPLICATION(S)

This patent document is a 371 of International Application No. PCT/US2017/017375, filed Feb. 10, 2017, which claims priority to and the benefit of Provisional Patent Application No. 62/293,685, filed on Feb. 10, 2016. The disclosure of the above applications are incorporated herein by reference for all purposes as if fully set forth herein.

PRIORITY CLAIM AND CROSS REFERENCE TO RELATED APPLICATIONS

This patent document claims the benefit of priority of U.S. Provisional Patent Application No. 62/293,685, filed on Feb. 10, 2016. The entire content of the before-mentioned patent application is incorporated by reference as part of the disclosure of this application.

TECHNICAL FIELD

This patent document relates to optical fibers and characterization of optical fibers to determine the spatial distribution of certain fiber parameters such as stress, bending and others.

BACKGROUND

An optical fiber tends to be subject to bending, forces or stresses in applications. For example, fibers used for an optical network or fiber communication link, such as International Telecommunication Union recommended ITU-T G.652 single-mode optical fiber and cable, would suffer a fiber bend or stress loss which may adversely affect the performance or reliability of the fiber. Such fiber bending or stress could be measured by a commercial multiple-wavelength optical time domain reflectometer (OTDR), e.g. at 1310 nm or 1550 nm.

SUMMARY

This patent document discloses, among others, techniques and devices for measuring distributed optical phase or optical length or strain dependent characteristics of optical paths and distributed measurements of acoustic or vibration or strain parameters, for example, acoustic or vibration amplitude, frequency, etc., between at least two different fiber locations at a particular fiber distance, i.e. location, of an optical path which comprises mostly optical waveguide, such as an optical fiber or cable link, for example, for an optical fiber used for the optical sensing or fiber network. Examples disclosed in this document use a light input unit and a light output unit connected to a sensing fiber under test (S-FUT) at one end to direct probe light into the S-FUT and to also receive and detect the returned probe light from the S-FUT at the same end.

In one aspect, the disclosed technology provides a light input unit coupled to the S-FUT to inject two or more light pulses at least one wavelength into the S-FUT, one pulse after another, and an output light unit coupled to the S-FUT in the same end to receive and extract corresponding light signals from the S-FUT. The received light is analyzed to extract information that includes output light power level, optical phases or optical delays, and processes the corresponding electrical signal of the received light to obtain information at each distance along S-FUT. A processing unit can be used to compute the light power, optical phase or optical delay parameter and the differences in one or more measured parameters corresponding to optical pulses from at least one different S-FUT distance, for example, for pulse number n+k and pulse number n, respectively, where n and k can be any integral value, the measured power or phase or delay difference parameter at a pair of pulses being proportional to local fiber acoustic and/or vibration and/or strain related characteristics. The processing unit can also be used to calculate the at least one acoustic and/or vibration and/or strain related S-FUT characteristics, for example strength of acoustic and/or vibration and strain, etc., as at least one predetermined function or pre-known reference event of said fiber event parameter value, for example, based on amplitude, frequency, and a processing unit further computes at least acoustic and/or vibration and/or strain related fiber characteristics as at least one predetermined function or pre-known reference event of said the acoustic and/or vibration related S-FUT parameters.

The disclosed technology provides, in implementations, an instrument calibration or reference procedure of the fiber acoustic and/or vibration and/or strain and/or optical phase and/or delay length information to accurately measure/characterize acoustic and/or vibration and/or strain related characteristics on the S-FUT and to obtain information on relevant event in connection with the obtained measurements.

In another aspect, the disclosed technology can be implemented to provide an identification of event type along an optical S-FUT path from measured at least one acoustic and/or vibration and/or strain related information, for example vibration induced by human dig, walk, vehicle, any field engineering work, human intrusion, etc., by adding additional known references on a S-FUT by using both a light input unit and a light output unit connected to the S-FUT at one single end, and such measurement procedure may be extended to use seismic vibration source for oil and gas exploration, etc.

In yet another aspect, the disclosed technology can be implemented to provide an enhanced identification of the event type along an optical sensing fiber (S-FUT) path from measured at least one acoustic and/or vibration related information with a high reliability by using either or both of a highly sensitive sensor design and embedded high back reflections, for example, in-line fiber Bragg gratings for the S-FUT. In some implementations, the reflectivity of embedded high back reflections may be from −10 dB to −70 dB, for example.

The above and other aspects and implementations are described in greater detail in the drawings, the description and the claims.

BRIEF DESCRIPTION OF DRAWINGS

FIG. 1 is a schematic diagram of an example of a high spatial resolution coherent OTDR for demodulating the optical phase, compensating laser phase noise and removing polarization fading.

FIG. 1A is a schematic diagram of an example of a high spatial resolution coherent OTDR as the FIG. 1 but without reference fiber.

FIG. 1B is a schematic diagram of an example of a high spatial resolution coherent OTDR as the FIG. 1A but without phase modulation.

FIG. 1C is a schematic diagram of an example of a high spatial resolution coherent OTDR as the FIG. 1A but using 1×2 and 2×3 couplers.

FIG. 1D is a schematic diagram of an example of a high spatial resolution coherent OTDR as the FIG. 1A but using polarization modulation or polarization controller.

FIG. 1E is a schematic diagram of an example of a high spatial resolution coherent OTDR as the FIG. 1A but using both polarization modulation or polarization controller and delay adjustment to control interferometer time or length delay.

FIG. 1F is a schematic diagram of an example a high spatial resolution coherent OTDR for demodulating the optical phase, compensating laser phase noise and polarization diversity detectors (PDD) of two, three, four or more detector channels for removing polarization fading.

FIG. 1G is a schematic diagram of an example of a high spatial resolution coherent OTDR for demodulating the optical phase, compensating laser phase noise and removing polarization fading.

FIG. 1H is a schematic diagram of an example of a low-cost high spatial resolution coherent OTDR for measuring the optical phase signal, compensating laser phase noise.

FIG. 1I is a low-cost schematic diagram of a high spatial resolution coherent OTDR embodying an aspect of the present invention for measuring the optical phase signal, compensating laser phase noise by using faraday rotator mirrors to remove any polarization fading from compensator.

FIG. 1J is a schematic diagram of an example of a low-cost high spatial resolution coherent OTDR for measuring the optical phase signal, compensating laser phase noise by using faraday rotator mirrors to remove any polarization fading from compensator with low-cost design using coupler port as input power in to detector.

FIG. 2 is a schematic diagram of an example of a high spatial resolution coherent OTDR embodying an aspect of the present invention for demodulating the optical phase, compensating laser phase noise and removing polarization fading where to have a programmable optical delay length and polarization scrambling.

FIG. 2A is a schematic diagram of an example of a high spatial resolution coherent OTDR for demodulating the optical phase, compensating laser phase noise and removing polarization fading, having a programmable optical delay length, and using faraday rotator mirrors to remove any polarization fading from compensator.

FIG. 3 is a schematic diagram of an example of a high spatial resolution coherent OTDR to measure acoustic and/or vibration and/or strain signals by using conventional fiber in the metal tube (FIMT).

FIG. 3A is a schematic diagram of an example of a high spatial resolution coherent OTDR to measure acoustic and/or vibration and/or strain signals or any vibration and or acoustic signals in the monitoring subjects such as oil or gas pipelines by using conventional fiber.

FIG. 3B is a schematic diagram of an example of a high spatial resolution coherent OTDR to measure acoustic and or vibration and or strain signals by using fiber ring along a cylinder tube or material with similar shape.

FIG. 4 is a schematic diagram of an example of a high spatial resolution coherent OTDR to measure acoustic and or vibration and or strain signals by using fiber Bragg grating (FBG) along the fiber cable in the metal tube (FIMT).

FIG. 4A is a schematic diagram of an example of a high spatial resolution coherent OTDR to measure acoustic and or vibration and or strain signals by using fiber Bragg grating (FBG) where the fiber cable between any two FBG being rolled along a cylinder tube or material with similar shape.

DESCRIBED DESCRIPTION

An optical fiber used for the optical sensing and fiber optical monitor network systems may be subject to or suffer fiber vibration or acoustic or strain signals. For example, International Telecommunication Union recommended ITU-T G.652 or G.657 single-mode optical fiber and cables may be used in fiber sensing applications. Such vibration, acoustic or strain signals in a fiber sensing system may be measured by a coherent optical time domain reflectometer (C-OTDR), e.g., at 1550 nm or any wavelength within telecom bands from 1250 nm to 1650 nm, to distinguish an acoustic or vibration or strain signals from outside intrusions, such as personal voice, running or walking, or vehicle running, or machine digging, etc., by use of the measured fiber optical phase or length difference information between at least two different fiber distances or locations at one given wavelength.

Advantageously such measurement procedures can be extended to using a seismic vibration source for oil and gas exploration and other applications based on an interferometric method in which a vibration or an acoustic or a strain signal can induce a variation in the optical phase or length in a sensing fiber, such as a frequently installed telecom optical fiber. Although a traditional OTDR method could distinguish a fiber loss and length, however, various implementations of such method usually could not provide acoustic or vibration or strain characteristics on the sensing fiber because the traditional OTDR devices tend to have insufficient optical coherence that is needed to measure the optical phase or delay and cannot measure a high frequency for acoustic or vibration signals, such as from 10 Hz to several kHz, e.g. >100 kHz.

In order to properly characterize the acoustic or vibration or strain signal on the sensing fiber (S-FUT) it is important to estimate the fiber local optical phase or length prosperities, e.g. signal amplitude, frequency, etc., for a communications sensing optical fiber cable, e.g. using G.652 or G.657 or any single mode fiber (SMF) or even multi-mode fiber (MMF), so that it could be possible to accurately estimate any acoustic or vibration or strain signals along or close sensing fiber, however, currently OTDR measurement technique could not only provide such measurements, etc.

Thus, there is a need for a new method for characterizing such acoustic—or vibration—or strain-related fiber characteristics as a function of distance along a sensing fiber cable (S-FUT), for example, from a single-end of the sensing fiber, that can be used for the field monitoring, test and measurement for the optical sensing networks, for example, along oil or gas pipeline, well, etc. One potential test method to measure fiber acoustic or vibration or strain is to measure an acoustic or vibration or strain induced fiber length or optical phase or optical length delay changing or vibration, where the fiber length or optical phase can be induced by the fiber vibration or movement or strain or pressure and is proportional to acoustic or vibration or strain intensity as well following acoustic or vibration or strain signal frequency, so that it is possible to know both amplitude and frequency of the signal under testing properties, where previous reported methods may only determine relevant signal intensity for example in sine function that could not provide accurately signal amplitude and frequency as well previous reported methods may limit the laser coherence that may degrade the interference signal so as to have a poor optical signal to noise ratio.

The disclosed technology in this patent document can be implemented in ways that meet a need for characterizing such high spatial resolved acoustic—or vibration—or strain-dependent characteristics as a function of distance along a sensing fiber cable from a single-end of the sensing fiber that could also distinguish event type based on the measured or monitored signals' amplitude and/or frequency, etc.

Various aspects of the disclosed technology, and their respective implementations, are based on measuring the acoustic or vibration or strain related proprieties. Embodiments of these aspects can be advantageously used for single-ended measurement of optical sensing fiber acoustic or vibration or strain signal, for example for the pipeline, security, oil and well gas test, measurement and monitoring applications.

The disclosed examples provide devices that include (i) an optical source controller, (ii) an detection and demodulation unit, and (iii) an analogue and digital signal processing unit together with one single control unit, where all of the components of the measuring instrument are at the single (same) end of the sensing fiber. Different implementations disclosed herein include different features.

For example, in one implementation of the disclosed technology, a coherent optical time domain reflectometer device can be constructed to include a coherent light source that produces coherent probe light pulses at an optical wavelength; an optical coupling unit coupled to one end of a fiber link under test to direct the coherent probe light pulses into the fiber link under test and to receive reflected probe light pulses from the fiber link under test; an optical detection unit coupled to the optical coupling unit to receive the reflected probe light pulses and structured to include an optical interferometer to process the reflected probe light pulses along two different optical paths to generate different optical output signals from the reflected probe light pulses along different optical paths, and optical detectors respectively in the different optical paths to receive the optical output signals from the optical interferometer; and a device controller coupled to the optical detection unit to receive detector output signals from the optical detectors and to process the detector signals to extract information on spatial distribution of acoustic—or vibration—or strain-dependent characteristics as a function of distance along the fiber link under test. The optical interferometer in the optical detection unit can be in various interferometer configurations, including the Mach-Zehnder interferometers with two optical paths as illustrated in the drawings of examples in this document. One or more optical phase modulators or optical delay devices may be inserted in either or both of the optical paths coupled to adjust or modulate an optical phase or delay difference between two different optical paths within the optical interferometer.

For the high spatial-resolved coherent optical time domain reflectometer (C-OTDR) as illustrated in an embodiment of FIG. 1 comprises at least one pulsed or modulated coherent light source (22) from a CW high coherent laser source (20), where the CW laser source (20) may have a linewidth of 10 Hz to 10 MHz, and the measurement would be performed for at least two different times, e.g. $t_1$ and $t_2$, and preferably such measurement can be repeated for tens to thousands and thousands times and/or seconds (minutes) or for a user defined measurement times and or seconds (minutes). The laser could be a distributed feedback (DFB) laser, an external-cavity laser (ECL), a fiber DFB laser, etc., for example along 1550 nm, or a suitable wavelength from 1250 nm to 1650 nm, and optionally optical fiber amplifier (OFA) 24 can amplify a pulse light to a high power level, such as from −10 dBm to 40 dBm, and optionally an optical filter 26 can reduce or remove amplified spontaneous emission (ASE) light from OFA 24, and optical circulator 28 as a back-reflection lights extractor, optionally an OFA 32 in the return route to amplify those return weak back-reflected lights, and optionally an optical filter 34 usually to filter most of ASE light noise, especially a very narrow bandpass filter may be used to improve an optical signal to noise ratio. In some implementations, the OFA 32 and the filter 34 may be eliminated if the detection system is sensitive enough to these back-reflected lights. In certain implementations, the detection system may further include hardware 38 for implementing an optical phase demodulation method, for example using a 3×3 coupler 40, where a phase modulation device 38 may be used in the interferometer type optical phase demodulation schemes. It is noted that phase demodulation coupler 40 may be a suitable optical coupler with desired optical splitter ratio and/or with suitable number of ports, e.g. N'×N coupler, where N and N' can be any integral number, where preferably to use 1×3 or 3×3 coupler as a phase de-modulator device 40. The demodulation device 40 may follow zero or one or more than one polarization controllers 41A, 41B, 41C and zero or one or more than one polarizers 42A, 42B, 42C for reducing or completely removing polarization fading. The interferometer type optical phase demodulation schemes with an optical delay can also compensate the laser phase noise so as to use a shorter coherence length laser, where an optical delay length may be typically set to be equal to a light pulse length in some implementations but may also be set at other suitable optical delay lengths. The detection devices 44A, 44B, 44C may follow at least one or more photo-detectors. The sampling unit and data processor are provided as part of and are controlled by a control unit 200. A sampling unit within the control unit 200 performs signal sampling and or averaging for one (no averaging) to more sampling data at different times that is synchronized with the light pulsed source 22 via control 200. The light pulsed source 22 is launched into a sensing fiber-under-test (S-FUT) 100 from a connector, e.g. FC/APC or any type connector, which also receives corresponding back-reflected lights from the sensing fiber 100 that are caused by Rayleigh scattering or any type light back-reflectors, and, in some cases, discrete (Fresnel) reflections via the connector or fiber Bragg grating in the reverse direction.

In addition to controlling the sampling operation, in some implementations, the control unit 200 can be used to control or select the returned back-reflected light pulse for no averaging, partial averaging, averaging and for performance signal processing. More specifically, for each setting k of the laser pulses, the control unit 200 causes the back-reflected power to be measured at least one pair of times $t_1$ and $t_2$, respectively, that are closely-spaced relative to each other. The middle point time of the time pair is defined as the average of two actual tikes, i.e., $t_m=(t_1+t_2)/2$. A power difference in one pair of times is a sensing fiber probed acoustic or vibration or strain signal's variation between times $t_1$ and $t_2$. The same computation may be performed for many different OTDR trace pairs for many different times. Other signal processing may be applied, for example, for averaging those signal differences for a user defined time period with their absolutely values or in root-mean-squired (RMS) means.

Other different embodiments as shown in FIGS. 1A, 1B, 1C, 1D and 1E are also possible. The FIG. 1A is a schematic diagram of a high spatial resolution coherent OTDR as the FIG. 1 but without reference fiber 30. This is because a reference may not be necessary in such implementations if other calibration techniques can be used.

FIG. 1B is a schematic diagram of a high spatial resolution coherent OTDR as the FIG. 1A but without phase modulation 38 if an exactly phase measurement may not be required or may be obtained by other means, e.g., a factory calibration or a user calibration.

FIG. 1C is a schematic diagram of a high spatial resolution coherent OTDR as the FIG. 1A by using a 1×2 coupler 37 as one example implementation of the M'×M coupler and a 2×3 coupler 41 as one example implementation of the N'×N coupler. Those are examples of the type of optical couplers that may be used and other coupler configurations may also be used.

FIG. 1D is a schematic diagram of a high spatial resolution coherent OTDR as the FIG. 1A and adds a polarization modulation or polarization controller 52 to control the output SOP (state of polarization) before detectors.

FIG. 1E is a schematic diagram of a high spatial resolution coherent OTDR as the FIG. 1A but using both polarization modulation or polarization controller 52 and delay adjustment 54 to control interferometer time or length delay.

Other implementations are possible and some examples are shown in FIGS. 1F, 1G, 1H, 1I and 1J.

In FIGS. 1F and 1G, the measured powers from three 44A, 44B and 44C or four detectors are summed together before sampling, and FIG. 1A is embodying polarization diversity detectors (PDD) of two, three, four or more detector channels for removing polarization fading, but in FIG. 1C only one detector 44 is used. In order to remove any polarization problem from interferometer type delay, in FIG. 1H, two Faraday rotation mirrors 50A and 50B are used to reflect the laser lights back, where coupler 36 can be any ratio coupler, for example, 2×2 or 3×3 or 1×3 or 2×3 coupler or any type fiber coupler or even in free space light beam splitter, in such case an optic router, i.e. optic circulator or coupler, may be used but it is not necessary since another un-used input ports from the coupler 36 may be used for an optical router before the detector 44. It is worthy to be noted that in the FIGS. 1H, 1I and 1J at least one detector may be used but preferably to use at least two or three detectors for optical phase demodulation. In another design configuration, in order to reduce or remove polarization fading, a polarizer may be inserted between coupler and detector and at least two detectors may be used and preferably three or four detectors may be used to completely remove any polarization fading but still maintain a high Optical Signal Noise Ratio (OSNR).

FIG. 2 shows an example which uses at least two detectors probably three detectors 44A, 44B, 44C for optical phase demodulation but any others are the same as in FIG. 1. In FIG. 2A polarization effect from optical interferometer based compensator can be removed by using FRM 50A and 50B. Indeed in such case polarization fading is still existed from sensing fiber but it is dependent on the sensing length spatial resolution and interferometer delay length 100 so its polarization fading could be much small or even not existed if short pulse length may be used, for example from 1 ns to 10,000 ns, and in fact it is true for most standard telecom fibers such as G.652 and G.657 single mode fibers.

FIG. 3 provides a real test service for example for field service or monitoring where a coherent distributed acoustic sensor (DAS), i.e. C-OTDR, 300 is used as an instrument to launch the cohere light pulses into sensing fiber 100 as well as a receiver and demodulator to measure or monitor the optical phase or interfered light signal variations because these acoustic or vibration or strain signals are hit the sensing fiber 100, where the weak RBS lights from the sensing fiber is detected. FIG. 3A provides a high spatial resolution coherent OTDR to measure acoustic and/or vibration and/or strain signals or any vibration and or acoustic signals in the monitoring subjects such as oil or gas pipelines by using conventional fiber. The sensing fiber may be wound along or straightly tied with the gas or oil pipelines.

Advantageously in FIG. 3B the sensing fiber may be winded or rolled along the cylinder tubes 120 to improve sensing fiber detection sensitivity.

Furthermore in FIG. 4 the sensing fiber 140 may be written to have a series fiber Bragg gratings to have a reflection coefficient of −70 dB to −10 dB so as to increase back-reflected the light intensity to improve the DAS measurement sensitivity and accuracy. Indeed such a sensing design for the sensing fiber 140 can reduce the DAS 300 design complex so as to reduce its cost but even significantly improve measurement accuracy. FIG. 4A is further to mandrel the sensing fiber on the cylinder tubes 160 with in-line FBGs so as to improve sensing fiber detection sensitivity but still maintaining a high spatial resolution.

Aspects in operation of the DAS 300 (C-OTDR) for the distributed measurement of fiber acoustic or vibration or strain prosperities as a function of sensing fibre length (distance) are described below.

The user first causes the system to initialize the C-OTDR DAS 300, specifically initializing the pulsed light source 20 and 22, the DAS detection and processing section, acquisition for the N (N≥2) (high) spatial-resolved different C-OTDR traces at N different times so as to measure or monitor the acoustic or vibration or strain induced fiber length or optical phase vibrations for at least two different times at least one monitoring sensing fiber location. Such DAS acquisition processing can be processed as long as user required period, for example for less than one second to over several days, weeks, months or even years. The more sensitive it is to the fiber induced length delay or optical phase changing from acoustic or vibration or strain signals so as to obtain a more sensitive acoustic or vibration or strain measurement. Otherwise, if there is no any acoustic or vibration or strain signal induced fiber length or optical phase changing, it is impossible to characterize any acoustic or vibration or strain properties, such as human running, machine working, or any three party intrusion, oil or gas leakage, etc. For most commercial OTDR, an InGaAs APD may be used. However, advantageously a high-sensitive InGaAs APD with TEC cooler may be used so that it can be more sensitive to the detected lights, e.g. at 1550 nm. For the C-OTDR DAS, preferably a highly coherent laser is used following with an optical switch, for example any CW coherent laser plus any type of optical modulator including semiconductor optical amplifier (SOA). Also any other laser and detector may also be possible to be used, for example to use a laser wavelength >1700 nm or <1200 nm for the pulsed DFB, pulse ECL, pulse DFB fiber laser, or any CW coherent laser plus any type optical modulator including semiconductor optical amplifier with any relevant photodetector that can detect the light beyond wavelength 1700 nm or <1200 nm. Indeed such laser and photodetector are commercially available.

The instrument then calculates the fibre length or delay changing or optical phase variation induced by acoustic or vibration or strain signals for the sensing fiber in a distributed way to spatially resolved fiber length e.g. from 0.1 m to 10,000 m. If there may be an optical phase or fiber length or strain difference on the sensing fiber between any two C-OTDR measurements at different times, then an acoustic or vibration signal amplitude or frequency on the sensing fibre (S-FUT) may be determined, but preferably such measurement can be lasted as long as a time period for the user's requirements (interesting). If there is only one measurement the acoustic or vibration signal may still be determined but need to compare with a reference, e.g. a reference fiber.

The instrument will further perform a computation of the signal's amplitude and frequency according to the measured fiber length or optical phase changing and such fiber length or optical phase changing could be determined exactly, for example by using a factory calibrated phase or real-time calibration by the modulator 38 for example such modulator may be operated at a very low frequency, e.g. 0.01 Hz to 100 Hz. In some implementations, it can be an advantage to have more than one measured fiber lengths or optical phases from two measurements so as to have an accurately acoustic or vibration or strain characterization.

Therefore the acoustic or vibration or strain strength and frequency as well such event characteristics for examples from human work or vehicle running or machine digging may be estimated, respectively, by using know references from event references measurements or their signatures.

The next operation in the processing is to compute acoustic or vibration or strain characteristics as a function of distance (z) along the sensing fiber (S-FUT) and measurement time then to plot a two dimension image such as a waterfall type display can be used for the measurement or monitoring, e.g. of any three party intrusion.

It should be understood that above steps might also be used by any other high sensitive OTDR or OFDR operation or any distributed measurements.

The examples for the data structure in the spatial domain are now described.

After the OTDR data acquisition or after a FFT operation of the OTDR data acquisition for at least two different sensing fibre locations, a new matrix data structure (1) is acquired that comprises K groups OTDR traces at K different times $t_n$ as a function of distance (z), each consisting of N points corresponding to N values of distance $z_n$ for one laser central wavelength, where n=1 . . . N, for totally K different wavelength lasers:

| | | (1) | | | |
|---|---|---|---|---|---|
| $t_1$ | $P_1(t_1, z_1)$ | . . . . . . | $P_1(t_1, z_n)$ | . . . . . . | $P_1(t_1, z_N)$ |
| . . . | . . . | . . . . . . | . . . | . . . . . . | . . . . . . |
| $t_k$ | $P_k(t_k, z_1)$ | . . . . . . | $P_k(t_k, z_n)$ | . . . . . . | $P_k(t_k, z_N)$ |
| . . . | . . . | . . . . . . | . . . | . . . . . . | . . . . . . |
| $t_K$ | $P_K(t_K, z_1)$ | . . . . . . | $P_K(t_K, z_n)$ | . . . . . . | $P_K(t_K, z_N)$ |

Signal or Imaging Processing of Distributed Acoustic or Vibration Measurement

After the measurement of back-reflected light power (e.g. from Rayleigh Back Scattering) carried acoustic or vibration or strain signal by an OTDR, a strain of sensing fiber between two different fiber distance $z_n$ and $z_{n+1}$ can be obtained. If there may be a fiber acoustic or vibration or strain signals then such signals may come fiber strain due to environmental variation and can be distinguished from others, such as temperature, etc., as described above.

Preferably, for the measurement of the spatial resolved signals at a specified distance z for each said group comprises distance pairs having substantially said prescribed center distance, and the said acoustic or vibration related S-FUT sensing characteristics is the location dependent signal values between at least two different sensing fiber lengths or distances.

After the calculation of the acoustic or vibration or strain signals induced spatial resolve measurement parameters, the acoustic or vibration or strain signal can be computed to extract its amplitude, frequency, etc. then events can be obtained by according to reference measurements.

In some implementations, at least one acoustic or vibration or strain or pressure related fiber characteristics is calculated as one predetermined function of the at least one acoustic or vibration or strain or pressure related S-FUT characteristics along an optical fiber path versus time.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is:

1. A coherent optical time domain reflectometer device, comprising:
   a coherent light source that produces coherent probe light pulses at an optical wavelength;
   an optical coupling unit coupled to one end of a fiber link under test to direct the coherent probe light pulses into the fiber link under test and to router reflected probe light pulses from the fiber link under test to an optical detection network;
   the optical detection network including an optical interferometer to process the reflected probe light pulses along two different optical paths to generate different optical output signals arising from interference between the reflected probe light pulses along different optical paths, and optical detectors respectively in the different optical paths to receive the optical output signals from the optical interferometer; and
   circuitry to control optical elements in the optical detection network and to process detector signals from the optical detectors to extract information on spatial distribution of acoustic- or vibration- or strain-dependent characteristics as a function of distance along the fiber link under test.

2. The device as in claim 1, wherein the optical detection network includes:
   different optical polarization controllers in the different optical paths, respectively; and
   optical polarizers respectively in the different optical paths downstream from corresponding optical polarization controllers to produce polarized output signal to the optical detectors, respectively.

3. The device as in claim 1, wherein the optical detection network includes a phase modulator coupled to the optical interferometer to adjust or modulate an optical phase difference between two different optical paths within the optical interferometer.

4. The device as in claim 1, wherein the circuitry is configured to obtain measurements of optical power levels of reflected probe light pulses at different times and an average power level of two or more reflected probe light pulses.

5. The device as in claim 1, wherein the optical coupling unit includes an optical circulator that includes a first optical port to receive light from the coherent light source, a second optical port coupled to the fiber link under test, and a third optical port coupled to the optical detection unit.

6. The device as in claim 1, wherein the optical interferometer includes a Mach-Zehnder interferometer.

7. The device as in claim 1, wherein the optical interferometer includes a polarization modulator in one of the two different optical paths.

8. The device as in claim 1, wherein the optical interferometer includes a phase modulator in one of the two different optical paths.

9. The device as in claim 1, wherein the optical interferometer includes a polarization modulator in one of the two different optical paths and a phase modulator in another one of the two different optical paths.

10. The device as in claim 1, wherein the coherent light source includes a laser that produces a laser beam, an optical modulator that receives the laser beam from the laser and modulates the received laser beam to produce a modulated laser beam, an optical fiber amplifier that receives and amplifies the modulated laser beam to produce an amplified modulated laser beam, and an optical filter that further filters the amplified modulated laser beam.

11. The device as in claim 1, wherein the optical detection network includes an optical fiber amplifier coupled to the optical coupling unit to receive and amplify the reflected probe light pulses, and an optical filter to further filter the amplified reflected probe light pulses from the optical fiber amplifier for further processing by the optical interferometer.

12. The device as in claim 1, wherein the optical interferometer includes a first optical Faraday rotator mirror in one of the two different optical paths and a second optical Faraday rotator mirror in another one of the two different optical paths.

13. A method for operating the device as in claim 1 to obtain a high spatial resolution coherent measurement of acoustic and/or vibration and/or strain signals, comprising using a metal tube to enclose the fiber link under test to direct the coherent probe light pulses.

14. A method for operating the device as in claim 1 to obtain a high spatial resolution coherent measurement of acoustic and/or vibration and/or strain signals, comprising wrapping the fiber link under the test around a pipeline.

15. A method for operating the device as in claim 1 to obtain a high spatial resolution coherent measurement of acoustic and/or vibration and/or strain signals, comprising providing fiber Bragg gratings (FBGs) along the fiber link.

16. A method for operating the device as in claim 1 to obtain a high spatial resolution coherent measurement of acoustic and/or vibration and/or strain signals, comprising discrete Fresnel reflections along the fiber link.

17. The device as in claim 1, wherein the optical interferometer includes an optical delay adjustment device in one of the two different optical paths.

18. The device as in claim 1, wherein the optical interferometer includes a 3×3 coupler to combine light from the two different optical paths.

* * * * *